US012552043B2

(12) United States Patent
T et al.

(10) Patent No.: US 12,552,043 B2
(45) Date of Patent: Feb. 17, 2026

(54) METHOD FOR CONTROLLING ROBOTIC ARM, ELECTRONIC DEVICE, AND COMPUTER-READABLE STORAGE MEDIUM

(71) Applicant: Jingdong Technology Information Technology Co., Ltd., Beijing (CN)

(72) Inventors: David T, Beijing (CN); Chao Xue, Beijing (CN)

(73) Assignee: Jingdong Technology Information Technology Co., Ltd., Beijing (CN)

(*) Notice: Subject to any disclaimer, the term of this patent is extended or adjusted under 35 U.S.C. 154(b) by 130 days.

(21) Appl. No.: 18/566,332

(22) PCT Filed: May 12, 2022

(86) PCT No.: PCT/CN2022/092572
§ 371 (c)(1),
(2) Date: Dec. 1, 2023

(87) PCT Pub. No.: WO2022/252959
PCT Pub. Date: Dec. 8, 2022

(65) Prior Publication Data
US 2024/0253236 A1    Aug. 1, 2024

(30) Foreign Application Priority Data
Jun. 4, 2021 (CN) .......................... 202110626122.1

(51) Int. Cl.
*B25J 9/16*      (2006.01)
*G06V 10/80*   (2022.01)

(52) U.S. Cl.
CPC .............. *B25J 9/1697* (2013.01); *B25J 9/16* (2013.01); *B25J 9/161* (2013.01); *B25J 9/163* (2013.01);
(Continued)

(58) Field of Classification Search
CPC ...... B25J 9/1697; B25J 9/1664; B25J 9/1602; B25J 9/1679; B25J 9/161; B25J 9/16;
(Continued)

(56) References Cited

U.S. PATENT DOCUMENTS 9,630,318 B2 * 4/2017 Ibarz Gabardos ..... G06N 20/00
10,207,402 B2 * 2/2019 Levine ..................... B25J 9/161
(Continued)

FOREIGN PATENT DOCUMENTS

CN    108115688 A    6/2018
CN    108555908 A    9/2018
(Continued)

OTHER PUBLICATIONS

International Search Report for PCT/CN2022/092572, dated Jul. 10, 2022, 4 pages.
(Continued)

*Primary Examiner* — Truc M Do
*Assistant Examiner* — Noah W Stiebritz
(74) *Attorney, Agent, or Firm* — Lippes Mathias LLP

(57) ABSTRACT

A method for controlling a robotic arm includes: acquiring a first depth image and a first color image of a target object; predicting first predicted values and second predicted values of respective candidate actions of the robotic arm based on the first depth image and the first color image, in which the first predicted value represents a probability of the robotic arm separating the target object from an adjacent object by executing the corresponding candidate action; and the second predicted value represents a probability of the robotic arm successfully grabbing the target object by executing the corresponding candidate action; determining a target action based on the first predicted values and the second predicted values of the candidate actions; and controlling the robotic arm to execute the target action.

17 Claims, 4 Drawing Sheets

(52) U.S. Cl.
CPC ............ *B25J 9/1664* (2013.01); *G06V 10/80* (2022.01); *G06T 2207/10024* (2013.01); *G06T 2207/10028* (2013.01); *G06T 2207/20084* (2013.01)

(58) Field of Classification Search
CPC ........ B25J 9/1661; B25J 9/163; B25J 19/023; G06T 7/73; G06T 7/70; G06T 7/246; G06T 7/90; G06T 7/55; G06T 19/20; G06T 11/00; G06T 5/50; G06T 9/002; G06T 2207/20084; G06T 2207/20081; G06T 2207/10028; G06T 2207/10024; G06T 2200/04; G06T 2207/20221; G06V 10/82; G06V 10/764; G06V 10/774; G06V 10/40; G06V 10/454; G06V 10/7715; G06V 10/24; G06V 10/20; G06V 10/766; G06V 10/752; G06V 30/1918; G06V 30/18057

See application file for complete search history.

(56) References Cited

U.S. PATENT DOCUMENTS

| | | | | |
|---|---|---|---|---|
| 12,017,368 | B2 * | 6/2024 | Tang | ............... B25J 9/1687 |
| 2020/0086483 | A1 | 3/2020 | Li et al. | |
| 2022/0121837 | A1 * | 4/2022 | Cesic | ................. G05D 1/69 |

FOREIGN PATENT DOCUMENTS

| | | | | | |
|---|---|---|---|---|---|
| CN | 109671102 | A | | 4/2019 | |
| CN | 111260649 | A | * | 6/2020 | ............ G06N 3/045 |
| CN | 112109086 | A | | 12/2020 | |
| CN | 112605983 | A | | 4/2021 | |
| CN | 112643668 | A | * | 4/2021 | ............ G06N 3/045 |
| CN | 112775959 | A | | 5/2021 | |
| JP | 2010207989 | A | | 9/2010 | |
| JP | 2019188580 | A | | 10/2019 | |
| KR | 20210010276 | A | * | 1/2021 | .......... B25J 11/0085 |
| KR | 20210053649 | A | | 5/2021 | |

OTHER PUBLICATIONS

OA for CN application 202110626122.1 & Engl Transl dated Dec. 26, 2024, 13 pages.
OA for JP application 2023-574642 & Engl Transl dated Dec. 3, 2024, 26 pages.

* cited by examiner

METHOD FOR CONTROLLING ROBOTIC ARM, ELECTRONIC DEVICE, AND COMPUTER-READABLE STORAGE MEDIUM

CROSS-REFERENCE TO RELATED APPLICATIONS

This application a US national phase application of International Application No. PCT/CN2022/092572, filed on Dec. 5, 2022, which claims priority to Chinese Patent Application No. 202110626122.1, filed on Jun. 4, 2021 in China, the entire contents of which are incorporated herein by reference into this paper.

TECHNICAL FIELD

The present disclosure relates to a field of artificial intelligence (AI) technologies, specifically to a field of computer vision technologies, and more specifically to a method for controlling a robotic arm, an electronic device, and a computer-readable storage medium.

BACKGROUND

In the field of robots, classification robots and service robots have a major role in scenarios such as human-computer interaction, and have received increasing attention in recent years. However, there is still a challenge that a robotic arm automatically grabs tightly stacked objects.

SUMMARY

According to an aspect of embodiments of the present disclosure, a method for controlling a robotic arm is provided. The method includes:
acquiring a first depth image and a first color image of a target object;
predicting first predicted values and second predicted values of respective candidate actions of the robotic arm based on the first depth image and the first color image, in which, the first predicted value represents a probability of the robotic arm separating the target object from an adjacent object by executing the corresponding candidate action; and the second predicted value represents a probability of the robotic arm successfully grabbing the target object by executing the corresponding candidate action;
determining a target action based on the first predicted values and the second predicted values of the candidate actions; and
controlling the robotic arm to execute the target action.

According to another aspect of embodiments of the present disclosure, a computer device is provided. The computer device includes a memory, a processor and a computer program stored on the memory and executable by the processor, in which, when executing the computer program, the processor is configured to:
acquire a first depth image and a first color image of a target object;
predict first predicted values and second predicted values of respective candidate actions of the robotic arm based on the first depth image and the first color image, in which, the first predicted value represents a probability of the robotic arm separating the target object from an adjacent object by executing the corresponding candidate action; and the second predicted value represents a probability of the robotic arm successfully grabbing the target object by executing the corresponding candidate action;
determine a target action based on the first predicted values and the second predicted values of the candidate actions; and
control the robotic arm to execute the target action.

According to another aspect of embodiments of the present disclosure, a non-transitory computer-readable storage medium with a computer program stored thereon is provided. When executed by a processor, the computer program is caused to implement:
acquiring a first depth image and a first color image of a target object;
predicting first predicted values and second predicted values of respective candidate actions of the robotic arm based on the first depth image and the first color image, in which, the first predicted value represents a probability of the robotic arm separating the target object from an adjacent object by executing the corresponding candidate action; and the second predicted value represents a probability of the robotic arm successfully grabbing the target object by executing the corresponding candidate action;
determining a target action based on the first predicted values and the second predicted values of the candidate actions; and
controlling the robotic arm to execute the target action.

Additional aspects and advantages of the present disclosure will be set forth in part in the following description, and in part will become obvious from the following description, or may be learned by practice of the disclosure.

BRIEF DESCRIPTION OF THE DRAWINGS

The above and/or additional aspects and advantages of the present disclosure will become obvious and easy to understand from the following description of the embodiments in conjunction with the accompanying drawings, in which.

DETAILED DESCRIPTION

Embodiments of the present disclosure are described in detail below, and examples of embodiments are illustrated in the accompanying drawings, in which the same or similar labels represent the same or similar elements or elements with the same or similar functions. The embodiments described below with reference to the drawings are exemplary, are intended to be configured to explain the present disclosure and are not to be construed as a limitation of the present disclosure.

A method and an apparatus for controlling a robotic arm, an electronic device and a storage medium according to embodiments of the present disclosure are described with reference to the accompany drawings.

Figure 1:
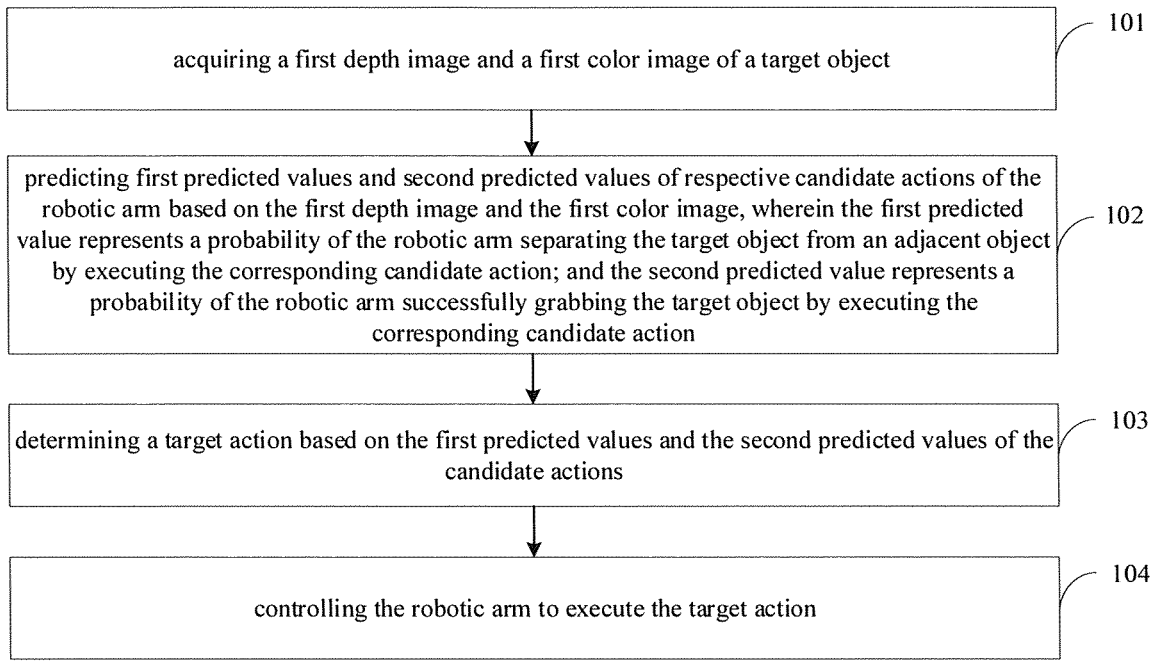
FIG. 1 is a flowchart illustrating a method for controlling a robotic arm provided in an embodiment of the present disclosure.

FIG. 1 is a flowchart illustrating a method for controlling a robotic arm provided in an embodiment of the present disclosure.

As illustrated in FIG. 1, the method may include the following steps 101 to 104.

At step 101, a first depth image and a first color image of a target object are acquired.

The first depth image is a depth image under a coordinate system of a robotic arm, and the first color image is a color image under the coordinate system of the robotic arm.

In the embodiment, current depth information and color information of the target object may be determined by acquiring the first depth image and the first color image of the target object.

In an implementation of embodiments of the disclosure, a captured original depth image and a captured original color image are acquired, and three-dimensional coordinate positions corresponding to pixel points in the original depth image and the original color image under the coordinate system of the robotic arm are obtained by converting the original depth image and the original color image to the coordinate system of the robotic arm.

Specifically, an original depth image $I_{depth}$ and an original color image $I_{color}$ are captured by using an RGB-D camera, in which a resolution of each of the original depth image and the original color image is M*N, where M and N are respectively a width and a height of each of the original depth image and the original color image. Each pixel point $P_{pix}$ in the original depth image and the original color image is converted to the coordinate system of the robotic arm, to obtain a three-dimensional coordinate position corresponding to each pixel point in the original depth image and the original color image, denoted as $P_w$:

$$P_w = R \times (K^{-1} \times z \times P_{pix}) + T$$

where, $K^{-1}$ denotes an inverse matrix of an internal parameter matrix, R denotes an external parameter rotation matrix, T denotes an external parameter translation matrix, and z denotes a depth in a coordinate system of a camera.

Further, two-dimensional coordinate points corresponding to the three-dimensional coordinate positions respectively are obtained by projecting the three-dimensional coordinate positions to a preset two-dimensional plane. As an implementation, X-axis and Y-axis coordinates $(x_w, y_w)$ in each three-dimensional coordinate position are mapped to a two-dimensional plane with a size of H×W, denoted as $(x_s, y_s)$:

$$(x_s, y_s) = (\text{floor}((x_w - x_l)/res), \text{floor}((y_w - y_l)/res))$$

where, $x_l$ denotes a minimum value of a working space in an X axis direction of the coordinate system of the robotic arm, $y_l$ denotes a minimum value of a working space in a Y direction of the coordinate system of the robotic arm, res denotes an actual size represented by each pixel after mapping, and floor(·) denotes a round down operation.

In an implementation of the embodiment, the preset two-dimensional plane is determined based on a minimum working distance along a preset direction under the coordinate system of the robotic arm.

Further, the first depth image is generated based on depths of the pixel points corresponding to the two-dimensional coordinate points in the original depth image, and the first color image is generated based on colors of the pixel points corresponding to the two-dimensional coordinate points in the original color image. Specifically, a depth Z of the pixel point corresponding to each of the two-dimensional coordinate points in the original depth image is transferred to a corresponding coordinate $(x_s, y_s)$ to obtain a depth state image with a size of H×W. Color information (r,g,b) of the pixel point corresponding to each of the two-dimensional coordinate points in the original color image is transferred to the corresponding coordinates $(x_s, y_s)$ to obtain a color state image $I_{color\_map}$ with a size of H×W.

At step 102, first predicted values and second predicted values of respective candidate actions of the robotic arm are predicted based on the first depth image and the first color image. The first predicted value represents a probability of the robotic arm separating the target object from an adjacent object by executing the corresponding candidate action, and the second predicted value represents a probability of the robotic arm successfully grabbing the target object by executing the corresponding candidate action.

The candidate actions include an action for separating a target object from an adjacent object, and an action for grabbing the target object.

In an embodiment, a feature corresponding to the first depth image and a feature corresponding to the first color image are extracted based on depth information carried in the first depth image and color information carried in the first color image, and the first predicted value and the second predicted value of each of the candidate actions of the robotic arm are predicted based on the extracted feature of the first depth image and the extracted feature of the first color image.

At step 103, a target action is determined based on the first predicted values and the second predicted values of the candidate actions.

In an embodiment, the first predicted values and the second predicted values of the candidate actions are compared, and a candidate action with a greater predicted value is determined as the target action. The target action is the action for separating the target object from the adjacent object, or the action for grabbing the target object.

At step 104, the robotic arm is controlled to execute the target action.

Further, the robotic arm is controlled to execute the target action based on the determined target action. In embodiments of the present disclosure, with predicting the first predicted values and the second predicted values of the respective candidate actions, the present disclosure may realize a collaborative analysis of a strategy of separating the target object from the adjacent object and a strategy of grabbing the target object, to select an action corresponding to a maximum predicted value as the target action, which improves an accuracy of determining the target action, avoids a collision of the robotic arm, and improves reliability of executing the action of the robotic arm.

In the method for controlling the robotic arm in the embodiment, the first depth image and the first color image of the target object are acquired. The first predicted values and the second predicted values of respective candidate actions of the robotic arm are predicted based on the first depth image and the first color image, in which the first predicted value represents the probability of the robotic arm separating the target object from the adjacent object by executing the corresponding candidate action, and the second predicted value represents the probability of the robotic arm successfully grabbing the target object by executing the corresponding candidate action; the target action is determined based on the first predicted values and the second predicted values of the candidate actions, and the robotic arm is controlled to execute the target action. In the disclosure, with predicting the first predicted values and the second predicted values of the respective candidate actions, the present disclosure may realize a collaborative analysis of a strategy of separating the target object from the adjacent object and a strategy of grabbing the target object, to select an action corresponding to a maximum predicted value as the target action, which improves an accuracy of determining the target action, reduces a probability of a collision of the robotic arm, improves reliability of executing the action of the robotic arm and further enhances a success rate of grabbing objects in a complicated environment.

Figure 2:
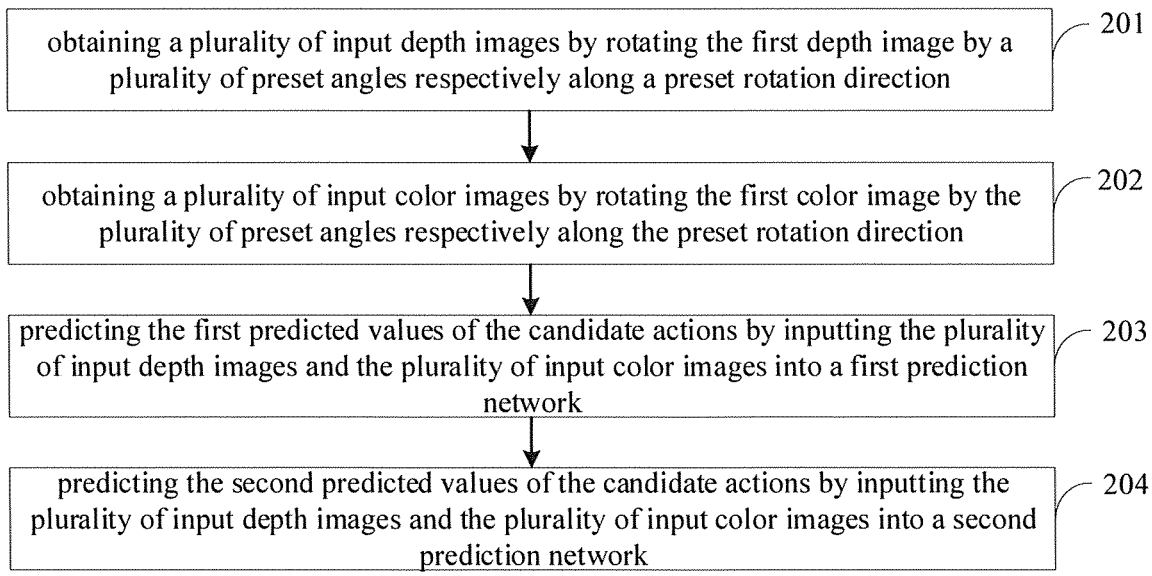
FIG. 2 is a flowchart illustrating another method for controlling a robotic arm provided in an embodiment of the present disclosure.

Based on the above embodiment, another method for controlling a robotic arm is provided in the present disclosure. FIG. 2 is a flowchart illustrating another method for controlling a robotic arm provided in an embodiment of the present disclosure.

As illustrated in FIG. 2, the step 102 may include the following steps 201 to 204.

At step 201, a plurality of input depth images are obtained by rotating the first depth image by a plurality of preset angles respectively along a preset rotation direction.

In an embodiment, in order to construct depth images in different scenarios to acquire features of more depth images, and constitute a state space of a reinforcement learning algorithm through the depth images and a plurality of color images obtained in the following steps, the plurality of input depth images are obtained by rotating the first depth image by the plurality of preset angles along the preset rotation direction.

For example, the first depth image is rotated by a rotation interval of $\Delta\Theta$ within a 360° circumference along the preset direction, such as, a counterclockwise rotation. In case of d=360°/$\Delta\Theta$ times, d groups of depth images with different rotation angles are obtained, and for example, a number d of the plurality of obtained depth images is 16.

At step 202, a plurality of input color images are obtained by rotating the first color image by the plurality of preset angles respectively along the preset rotation direction.

In an embodiment, in order to construct color images in different scenarios to acquire features of more color images, and constitute a state space of a reinforcement learning algorithm by the color images and the plurality of depth images obtained in the above steps, the plurality of input color images are obtained by rotating the first color image by the plurality of preset angles along the preset rotation direction.

For example, the first color image is rotated by a rotation interval of $\Delta\theta$ within a 360° circumference along the preset direction, such as, the counterclockwise rotation. In case of d=360°/$\Delta\Theta$ times, d groups of color images $I_{color\_map}^d$ with different rotation angles are obtained, and for example, a number d of the plurality of obtained color images is 16.

At step 203, the first predicted values of the candidate actions are predicted by inputting the plurality of input depth images and the plurality of input color images into a first prediction network.

The second prediction network consists of a feature extraction layer, a feature fusion layer, a prediction layer and a dynamic optimization layer.

Figure 3:
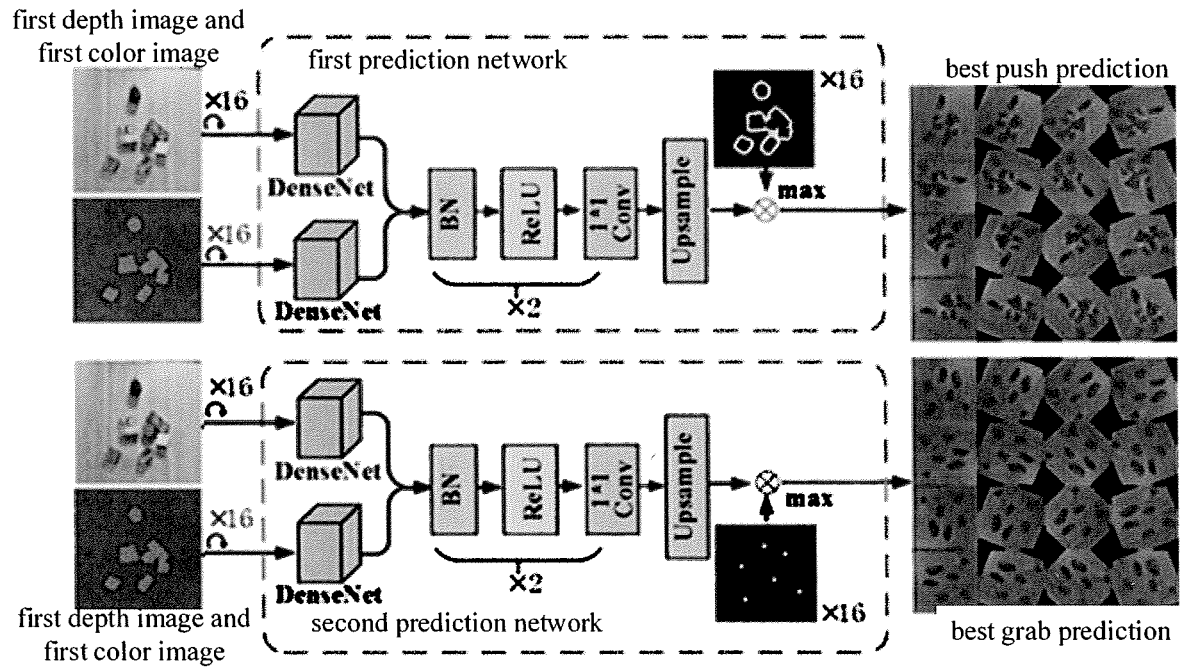
FIG. 3 is a diagram illustrating a structure of a prediction network provided in an embodiment of the present disclosure.

For example, as illustrated in FIG. 3, the feature extraction layer is a convolutional layer of a DenseNet network, and for example, a DenseNet-121 network pre-trained by ImageNet. The feature fusion layer consists of a batch normalization layer, a rectified linear unit activation layer, and a convolution layer with a convolution kernel size of 3×3. The prediction layer is an upstate layer.

In an implementation of the embodiment, features of the plurality of input depth images and the plurality of input color images are extracted by using a feature extraction layer of the first prediction network, and a plurality of first fusion feature images are obtained by fusing the features of the plurality of input depth images with the features of the plurality of input color images respectively. Each of the first fusion feature images is reversely rotated along the preset rotation direction, so that a direction of each of the first fusion feature image reversely rotated is consistent with a direction of the first depth image or the first color image. Further, the first predicted values of the candidate actions are obtained by performing an action prediction on the first fusion feature images reversely rotated by using a prediction layer of the first prediction network.

For example, as illustrated in FIG. 3, in an embodiment, taking the plurality of depth images and the plurality of color images having d=16 groups for example, each group includes one depth image and one color image. For illustration purposes, by taking a $d_i$ group for example, a feature extraction operation is performed on a depth image $I_{color\_map}^{d_i}$ and a color image $I_{color\_map}^{d_i}$ by a convolutional layer part of a DenseNet-121 network pre-trained by ImageNet to obtain a color feature image $I_{cfeat\_push}^{d_i}$ and a depth feature image $I_{dfeat\_push}^{d_i}$. Further, a channel splicing operation may be performed on the color feature image $I_{cfeat\_push}^{d_i}$ and the depth feature image $I_{dfeat\_push}^{d_i}$ to obtain an initial fusion feature image $I_{init\_fusion\_push}^{d_i}$, and the initial fusion feature image $I_{init\_fusion\_push}^{d_i}$ undergoes two convolution groups having a same structure and a deep fusion may be performed on features, such that a first fusion feature image $I_{fusion\_push}^{d_i}$ is obtained. Further, the first fusion feature image $I_{fusion\_push}^{d_i}$ is rotated clockwise, so that the rotated first fusion feature image has a same angle direction as the color image $I_{color\_map}$, to obtain a second fusion feature image reversely rotated. Similarly, second fusion feature images reversely rotated corresponding to other groups may be obtained. Further, the first predicted values of the candidate actions are obtained by performing the action prediction on each of the first fusion feature images reversely rotated by using the prediction layer of the first prediction network. In a possible implementation, the channel splicing operation is performed on each of the first fusion feature images reversely rotated to obtain a first predicted value $Q_1(s_t, a; \theta_1)$ with a $Q_1(s_t, a; \theta_1)$ dimensional size of H×W of each of the candidate actions at the prediction layer of the first prediction network, in which d groups of color images $I_{color\_map}^d$ and depth images $I_{depth\_map}^d$ acquired at a current time in a working space environment of the robotic arm are denoted as a state $s_t$, and $\theta_1$ denotes a first prediction network parameter, a denotes an action space that consists of a candidate action type of the robotic arm, an execution position $(x_w, y_w, z_w)$ of the robotic arm, a rotation angle $\Theta$ of a clamping jaw and a push length L of the clamping jaw.

At step 204, the second predicted values of the candidate actions are predicted by inputting the plurality of input depth images and the plurality of input color images into a second prediction network.

The first prediction network consists of a feature extraction layer, a feature fusion layer, a prediction layer and a dynamic optimization layer.

For example, as illustrated in FIG. 3, the feature extraction layer is a convolutional layer of a DenseNet network, and for example, a DenseNet-121 network pre-trained by ImageNet. The feature fusion layer consists of a batch normalization layer, a rectified linear unit activation layer, and a convolution layer with a convolution kernel size of 3×3. The prediction layer is an upstate layer.

In an implementation of the embodiment, features of the plurality of input depth images and the plurality of input color images are extracted by using a feature extraction layer of the second prediction network, and a plurality of second fusion feature images are obtained by fusing features of the plurality of input depth images with features of the plurality of input color images respectively. Each of the second fusion feature images is reversely rotated along the preset rotation direction, and the second reward values of the candidate actions are obtained by performing an action prediction on the second fusion feature images reversely rotated by using a prediction layer of a second prediction network.

For example, as illustrated in FIG. 3, in an embodiment, taking a plurality of depth images and a plurality of color images having d=16 groups for example, and each group includes one depth image and one color image. For illustration purposes, by taking a $d_i$ group for example, a feature extraction operation is performed on a depth image $I_{color\_map}^{i_i}$ and a color image $I_{color\_map}^{i_i}$ through a convolutional layer portion of a DenseNet-121 network pre-trained by ImageNet to obtain a color feature image $I_{cfeat\_group}^{i_i}$ and a depth feature image $I_{dfeat\_group}^{i_i}$. Further, a channel splicing operation may be performed on the color feature image and the depth feature image $I_{dfeat\_group}^{i_i}$ to obtain an initial fusion feature image $I_{init\_fusion\_group}^{d_i}$. The initial fusion feature image $I_{init\_fusion\_group}^{d_i}$ undergoes two convolution groups having a same structure, and a deep fusion may be performed on features of $I_{init\_fusion\_group}^{d_i}$ to obtain a second fusion feature image $I_{fusion\_group}^{d_i}$ corresponding to the $d_i$ group. Further, the second fusion feature image $I_{fusion\_group}^{d_i}$ is rotated clockwise, so that a rotated second fusion feature image is obtained in a same angle direction as a color state image $I_{color\_map}$. Similarly, second fusion feature images reversely rotated corresponding to other groups may be obtained. Further, the second predicted value of each of the candidate actions is obtained by performing the action prediction on each of the second fusion feature images reversely rotated by using the prediction layer of the second prediction network. In a possible implementation, the channel splicing operation is performed on each of the second fusion feature images reversely rotated to obtain a second predicted value $Q_2(s_t, a; \theta_2)$ with a d dimensional size of H×W of each of the candidate actions at the prediction layer of the second prediction network, in which d groups of color images $I_{color\_map}^d$ and depth images $I_{depth\_map}^d$ acquired at a current time in a work space environment of the robotic arm are denoted as a state $s_t$, and $\theta_2$ denotes a second prediction network parameter; a denotes an action space that consists of a candidate action type of the robotic arm, an execution position $(x_w, y_w, z_w)$ of the robotic arm, a rotation angle $\Theta$ of a clamping jaw and a push length L of the clamping jaw.

In the method for controlling the robotic arm in the embodiment, with rotating the first depth image by the plurality of preset angles respectively along the preset rotation direction and rotating the first color image by the plurality of preset angles respectively along the preset rotation direction, the method may constructs the color images and the depth images in different scenarios to acquire the features of more color images and depth images, and constitutes the state space of the reinforcement learning algorithm. Further, the first predicted value and the second predicted value of each of candidate actions are predicted by using the first prediction network respectively based on a state space formed by a plurality of groups of depth images and color images, the method may realize, based on the first predicted values and the second predicted values of the respective candidate actions, a collaborative analysis of a strategy of separating the target object from the adjacent object and a strategy of grabbing the target object, to select an action corresponding to a maximum predicted value as the target action, which improves an accuracy of determining the target action, reduces a probability of a collision of the robotic arm, improves reliability of executing the action of the robotic arm and further enhances a success rate of grabbing objects in a complicated environment.

Based on the above embodiment, an implementation is provided in the disclosure, which illustrates that the first predicted values and the second predicted values of the candidate actions obtained by prediction are corrected, to improve an accuracy of the first predicted values and the second predicted values, which further enhances an accuracy of determining the target action.

Figure 4:
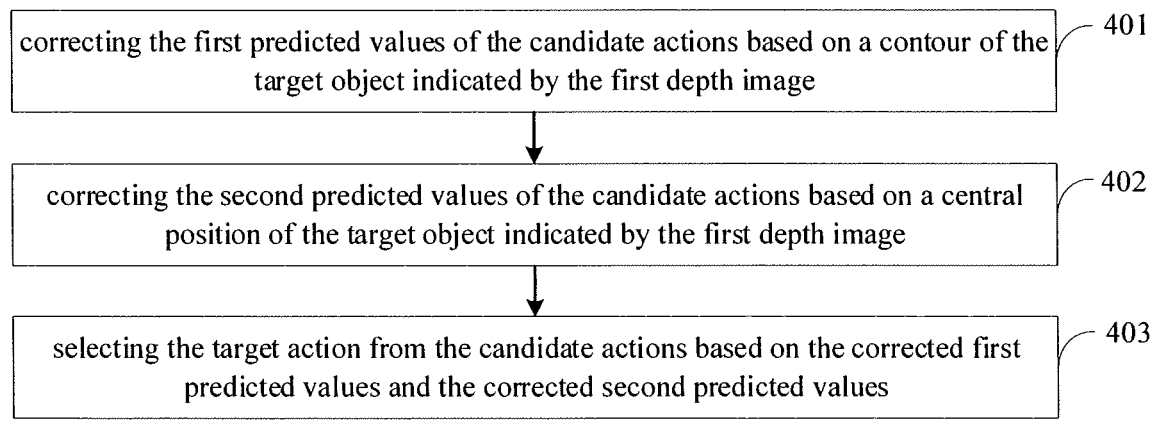
FIG. 4 is a flowchart illustrating another method for controlling a robotic arm provided in an embodiment of the present disclosure.

FIG. 4 is a flowchart illustrating another method for controlling a robotic arm in an embodiment of the present disclosure. As illustrated in FIG. 4, the step 103 includes the following steps 401 to 403.

At step 401, the first predicted values of the candidate actions are corrected based on a contour of the target object indicated by the first depth image.

As an implementation, a dynamic mask is obtained by calculation based on the contour of the target object indicated by the first depth image, and a corrected first predicted value of each of the candidate actions is obtained by multiplying the dynamic mask by the first predicted value of each of the candidate actions.

At step 402, the second predicted values of the candidate actions are corrected based on a central position of the target object indicated by the first depth image.

As an implementation, a dynamic mask is obtained by calculation based on the central position of the target object indicated based on the first depth image, and a corrected second predicted value of each of the candidate actions is obtained by multiplying the dynamic mask by the second predicted value of each of the candidate actions.

At step 403, the target action is selected from the candidate actions based on the corrected first predicted values and the corrected second predicted values.

In an implementation of the embodiment, a maximum value in the corrected first predicted values is determined based on the corrected first predicted values of the candidate actions, and a maximum value in the corrected second predicted values is determined based on the corrected second predicted values of the candidate actions. Further, a candidate action corresponding to a maximum predicted value is determined by comparing the maximum value in the corrected first predicted values with the maximum value in the corrected second predicted values, and the candidate action corresponding to the maximum predicted value is determined as the target action.

In a scenario, when the candidate actions include a "push action" and a "grab action", a corrected first predicted value of the "push action" and a corrected second predicted value of the "grab action" are determined, and further a maximum value in the corrected first predicted values is determined, and for example, the maximum value is the corrected first predicted value of the "push action". A corrected second predicted value of the "push action" and a corrected second predicted value of the "grab action" are determined, and further a maximum value in the corrected second predicted values is determined, and for example, the maximum value is the corrected second predicted value of the "grab action". Further, a greater predicted value is selected by comparing the corrected first predicted value of the "push action" with the corrected second predicted value of the "grab action", and the greater predicted value is selected, for example, is the corrected first threshold value of the "push action". As such, the "push action" is taken as the target action of the robotic arm.

In the method for controlling the robotic arm in the embodiment, the first predicted values and the second predicted values of the candidate actions are corrected, which improves an accuracy of the first predicted values and the second predicted values corresponding to the candidate actions. Further, the target action is determined based on the corrected first predicted values and the corrected second predicted values of the candidate actions, the method may realize a collaborative analysis of a strategy of separating the target object from the adjacent object and a strategy of grabbing the target object, to select an action corresponding to a maximum predicted value as the target action, which improves an accuracy of determining the target action, reduces a probability of a collision of the robotic arm, improves reliability of executing the action of the robotic arm and further enhances a success rate of grabbing objects in a complicated environment.

Based on the above embodiment, a possible implementation is provided in the disclosure, which illustrates how to train a first prediction network and a second prediction network.

Figure 5:
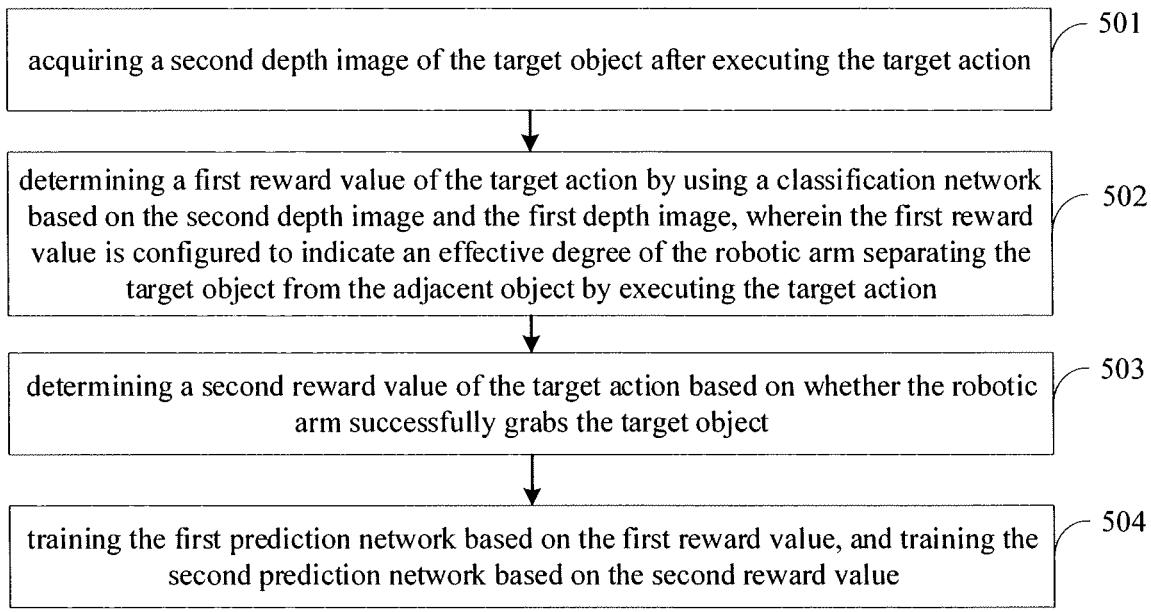
FIG. 5 is a flowchart illustrating another method for controlling a robotic arm provided in an embodiment of the present disclosure.

FIG. 5 is a flowchart illustrating another method for controlling a robotic arm in embodiments of the present disclosure. As illustrated in FIG. 5, the method includes the following steps 501 to 504 after the step 104.

At step 501, a second depth image of the target object after executing the target action is acquired.

After the robotic arm is controlled to execute the target action, a position distribution of the target object may vary, in which case, the second depth image of the target object after executing the target action is acquired. The method for acquiring the second depth image may refer to a description of the forgoing embodiment, which will not be limited in the disclosure.

At step 502, a first reward value of the target action is determined by using a classification network based on the second depth image and the first depth image. The first reward value is configured to indicate an effective degree of the robotic arm separating the target object from the adjacent object by executing the target action.

The first depth image is a depth image acquired before the robotic arm is controlled to execute the target action.

Figure 6:
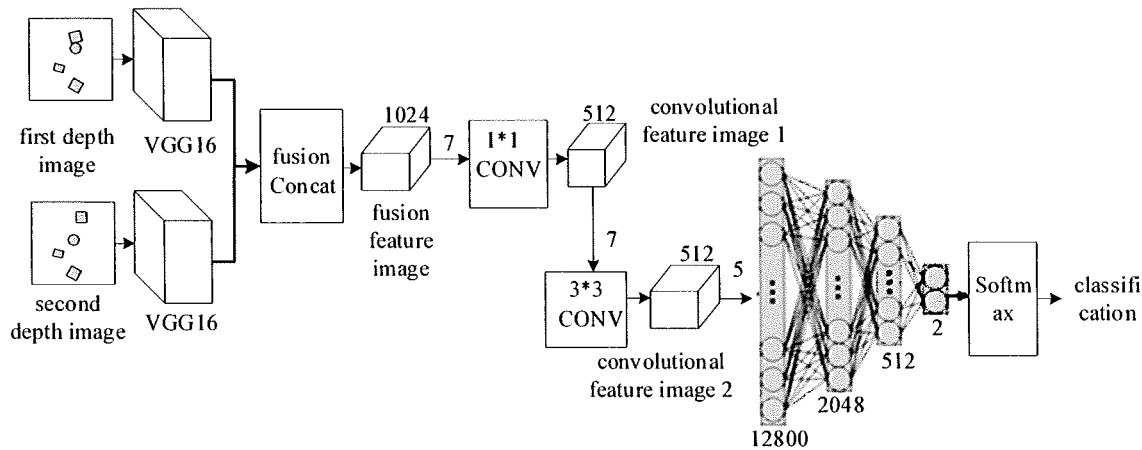
FIG. 6 is a diagram illustrating a structure of a classification network provided in an embodiment of the present disclosure.

As illustrated in FIG. 6, FIG. 6 is a diagram illustrating a structure of a classification network provided in an embodiment of the present disclosure. As illustrated in FIG. 6, the first depth image and the second depth image are as inputs of a classification network, a feature extraction is performed through a convolutional layer of a pre-trained VGG16 network on the first depth image and the second depth image respectively, and a channel splicing operation is performed on the extracted feature of the first depth image and the extracted feature of the second depth image to obtain a fusion feature image. Further, the fusion feature image undergoes a convolutional layer with a convolutional kernel of 1×1 to obtain a convolutional feature image 1, and further, the convolutional feature image 1 is input into a convolutional layer with a convolutional kernel of 3×3 to obtain a convolutional feature image 2; and finally, the convolutional feature image 2 passes through three full-connection layers, to determine a degree of separating the target object caused by the target action. Thus, the first reward value of the target action is determined based on the degree of separating the target object.

For example, the first reward value is $r_p$, $$r_p = \begin{cases} -0.5 & \text{if output} = 0 \\ 0.5 & \text{if output} = 1 \end{cases}$$

where, output=0 denotes that the target action can aggregate the target object, which does not facilitate successful grabbing of the target object, and the first reward value of the target action is determine as a penalty value of −0.5; output=1 denotes that the target action may can the object, which facilitates successful grabbing of the target object, and the first reward value of the target action is determined as a reward value of a positive 0.5.

At step 503, a second reward value of the target action is determined based on whether a robotic arm successfully grabs the target object.

In an implementation of the embodiment, the second reward value $r_g$ is defined as:

$$r_g = \begin{cases} 0 & \text{Grab failed} \\ 1.5 & \text{Grab Successed} \end{cases}.$$

When the robotic arm successfully grabs the target object after executing the target action, the 20 second reward value of the target action is determined as 1.5, and when the robotic arm successfully grabs the target object when executing the target action, the second reward value of the target action is determined as 0.

At step 504, the first prediction network is trained based on the first reward value, and the second prediction network is trained based on the second reward value.

In an implementation of the embodiment, a loss function of the first prediction network is:

$$\text{Loss}_{Q_1} = \left[Q_1(s_t, a_t; \theta_1) - \left(r_p + \gamma Q_1\left(s_{t+1}, \underset{a_{t+1}}{\mathrm{argmax}} Q(s_{t+1}, a; \theta_1); \theta_{1 target}\right)\right)\right]^2$$

where, $r_p$ denotes a first reward value, $s_t$ denotes a state space consisting by a plurality of depth images and a plurality of color images at a time point t, $Q_1(s_t, a_t; \theta)$ denotes a value function of a predicted value of a target action of the first prediction network at the time point t, $\theta_1$ denotes a network parameter at the current time point t, $\theta_{1target}$ denotes a target network parameter of the first prediction network, $$Q_1\left(s_{t+1}, \underset{a_{t+1}}{\mathrm{argmax}} Q(s_{t+1}, a; \theta_1); \theta_{1target}\right)$$

denotes a value function of a predicted value of the target action of the first prediction network at a time point t+1, and γ denotes an attenuation factor.

The parameter of the first prediction network is continuously adjusted based on the loss function determined by the first reward value, to train the first prediction network.

In an implementation of the embodiment, a loss function of the second prediction network is:

$$\mathrm{Loss}_{Q_2} = \left[Q_2(s_t, a_t; \theta_2) - \left(r_g + \gamma Q_2\left(s_{t+1}, \underset{a_{t+1}}{\mathrm{argmax}} Q_2(s_{t+1}, a; \theta_2); \theta_{2target}\right)\right)\right]^2$$

where, rg denotes a second reward value, $s_t$ denotes a state space consisting by the plurality of depth images and the plurality of color images at a time point t, $Q_2(s_t, a_t; \theta_2)$ denotes a value function of a predicted value of a target action of the second prediction network at the time point t, $\theta_2$ denotes a network parameter at the current time point t, $\theta_{2target}$ denotes a tar et network parameter of the second prediction network, $$Q_2\left(s_{t+1}, \underset{a_{t+1}}{\mathrm{argmax}} Q_2(s_{t+1}, a; \theta_2); \theta_{2target}\right)$$

denotes a value function of the predicted value of the target action of the second prediction network at a time point t+1, and γ denotes an attenuation factor.

The parameter of the second prediction network is continuously adjusted based on the loss function determined by the second reward value, to train the second prediction network.

In the method for controlling the robotic arm in the embodiment, the first prediction network is trained by using the first reward value by determining the first reward value and the second reward value, so that a trained first prediction network learns a correspondence between first predicted values of the candidate actions and the plurality of depth images and the plurality of color images, and the second prediction network is trained by using the second reward value so that the trained second prediction network learns a correspondence between second predicted values of the candidate actions and the plurality of depth images and the plurality of color images.

In order to implement the above embodiment, an apparatus for controlling a robotic arm is further provided.

Figure 7:
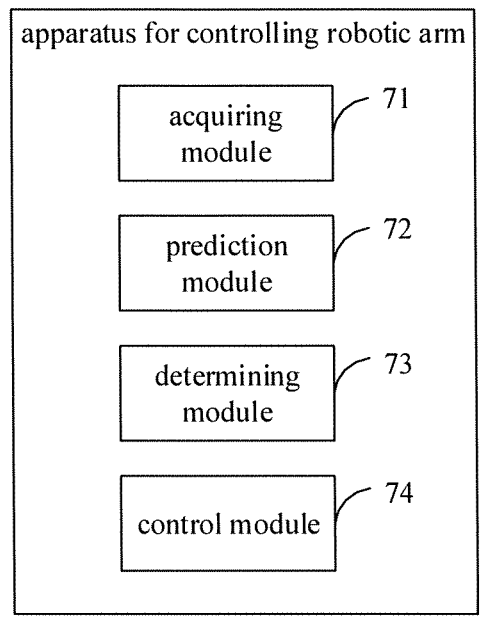
FIG. 7 is a block diagram illustrating a structure of an apparatus for controlling a robotic arm provided in an embodiment of the present disclosure.

FIG. 7 is a diagram illustrating a structure of an apparatus for controlling a robotic arm provided in an embodiment of the present disclosure.

As illustrated in FIG. 7, the apparatus includes an acquiring module 71, a prediction module 72, a determining module 73 and a control module 74.

The acquiring module 71 is configured to acquire a first depth image and a first color image of a target object.

The prediction module 72 is configured to predict first predicted values and second predicted values of respective candidate actions of the robotic arm based on the first depth image and the first color image. The first predicted value represents a probability of the robotic arm separating the target object from an adjacent object by executing the corresponding candidate action. The second predicted value represents a probability of the robotic arm successfully grabbing the target object by executing the corresponding candidate action.

The determining module 73 is configured to determine a target action based on the first predicted values and the second predicted values of the candidate actions.

The control module 74 is configured to control the robotic arm to execute the target action.

Further, in a possible implementation of embodiments of the present disclosure, the prediction module 72 is configured to:

obtain a plurality of input depth images by rotating the first depth image by a plurality of preset angles respectively along a preset rotation direction;

obtain a plurality of input color images by rotating the first color image by the plurality of preset angles respectively along the preset rotation direction;

predict the first predicted values of the candidate actions by inputting the plurality of input depth images and the plurality of input color images into a first prediction network; and predict the second predicted values of the candidate actions by inputting the plurality of input depth images and the plurality of input color images into a second prediction network.

In a possible implementation of embodiments of the present disclosure, the apparatus further includes an acquisition module, a processing module, and a training module.

The acquisition module is configured to acquire a second depth image of the target object after executing the target action.

The processing module is configured to determine a first reward value of the target action by using a classification network based on the second depth image and the first depth image. The first reward value is configured to indicate an effective degree of the robotic arm separating the target object from the adjacent object by executing the target action.

The determining module is configured to determine a second reward value of the target action based on whether the robotic arm successfully grabs the target object.

The training module is configured to train the first prediction network based on the first reward value, and train the second prediction network based on the second reward value.

In a possible implementation of embodiments of the present disclosure, the above processing module is configured to:

extract features of the first depth image and the second depth image respectively by using a feature extraction layer of the classification network;

obtain a first fusion feature by fusing the feature of the first depth image with the feature of the second depth image; and obtain the first reward value of the target action by performing a classification prediction on the first fusion feature by using a classification layer of the classification network.

In a possible implementation of embodiments of the present disclosure, the prediction module 72 is specifically configured to:

extract features of the plurality of input depth images and the plurality of input color images by using a feature extraction layer of the first prediction network, and obtain a plurality of first fusion feature images by fusing the features of the plurality of input depth images with the features of the plurality of input color images respectively;

reversely rotate each of the first fusion feature images along the preset rotation direction; and obtain the first predicted values of the candidate actions by performing an action prediction on the first fusion feature images reversely rotated by using a prediction layer of the first prediction network.

In a possible implementation of embodiments of the present disclosure, the prediction module 72 is specifically configured to:

extract features of the plurality of input depth images and the plurality of input color images by using a feature extraction layer of the second prediction network, and obtain a plurality of second fusion feature images by fusing features of the plurality of input depth images with features of the plurality of input color images respectively;

reversely rotate each of the second fusion feature images along the preset rotation direction; and obtain the second reward values of the candidate actions by performing an action prediction on the second fusion feature images reversely rotated by using a prediction layer of the second prediction network.

In a possible implementation of embodiments of the present disclosure, the determining module 73 is specifically configured to:

correct the first predicted values of the candidate actions based on a contour of the target object indicated by the first depth image;

correct the second predicted values of the candidate actions based on a central position of the target object indicated by the first depth image; and select the target action from the candidate actions based on the corrected first predicted values and the corrected second predicted values.

In a possible implementation of embodiments of the present disclosure, the acquiring module 71 is specifically configured to:

acquire a captured original depth image and a captured original color image captured; obtain three-dimensional coordinate positions corresponding to pixel points in the original depth image and the original color image under a coordinate system of the robotic arm by converting the original depth image and the original color image to the coordinate system of the robotic arm;

obtain two-dimensional coordinate points corresponding to the three-dimensional coordinate positions respectively by projecting the three-dimensional coordinate positions to a preset two-dimensional plane;

generate the first depth image based on depths of the pixel points corresponding to the two-dimensional coordinate points in the original depth image; and generate the first color image based on colors of the pixel points corresponding to the two-dimensional coordinate points in the original color image.

In a possible implementation of embodiments of the present embodiment, a preset two-dimensional plane is determined based on a minimum working distance along a preset direction under the coordinate system of the robotic arm.

It is noted that, the foregoing explanation of the method embodiment is also applicable to the apparatus embodiment, which will not be repeated here.

In the apparatus for controlling the robotic arm in the embodiment, the first depth image and the first color image of the target object are acquired. The first predicted values and the second predicted values of respective candidate actions of the robotic arm are predicted based on the first depth image and the first color image, in which the first predicted value represents the probability of the robotic arm separating the target object from the adjacent object by executing the corresponding candidate action, and the second predicted value represents the probability of the robotic arm successfully grabbing the target object by executing the corresponding candidate action; the target action is determined based on the first predicted values and the second predicted values of the candidate actions, and the robotic arm is controlled to execute the target action. In the disclosure, with predicting the first predicted values and the second predicted values of the respective candidate actions, the present disclosure may realize a collaborative analysis of a strategy of separating the target object from the adjacent object and a strategy of grabbing the target object, to select an action corresponding to a maximum predicted value as the target action, which improves an accuracy of determining the target action, reduces a probability of a collision of the robotic arm, improves reliability of executing the action of the robotic arm and further enhances a success rate of grabbing objects in a complicated environment.

In order to achieve the above embodiments, a computer device is provided. The computer device includes a memory, a processor and a computer program stored on the memory and executable by the processor, in which the processor is configured to implement the method for controlling the robotic arm as described in the above method embodiments when executing the computer program.

In order to implement the above embodiment, a non-transitory computer-readable storage medium with a computer program stored thereon is provided. The computer program is caused to implement the method for controlling the robotic arm as described in the above method embodiments when executed by a processor.

In order to implement the above embodiment, a computer program product is provided. Instructions in the computer program product is caused to implement the method for controlling the robotic arm as described in the above method embodiments when executed by a processor.

In order to implement the above embodiment, a computer program including a computer program code is provided. A computer is caused to implement the method for controlling the robotic arm as described in the first method embodiments when the computer program code is running on the computer.

It is noted that, the foregoing explanation of the method embodiments is also applicable to the computer device, the non-transitory computer-readable storage medium, the computer program product and the computer program, which will not be repeated here.

Figure 8:
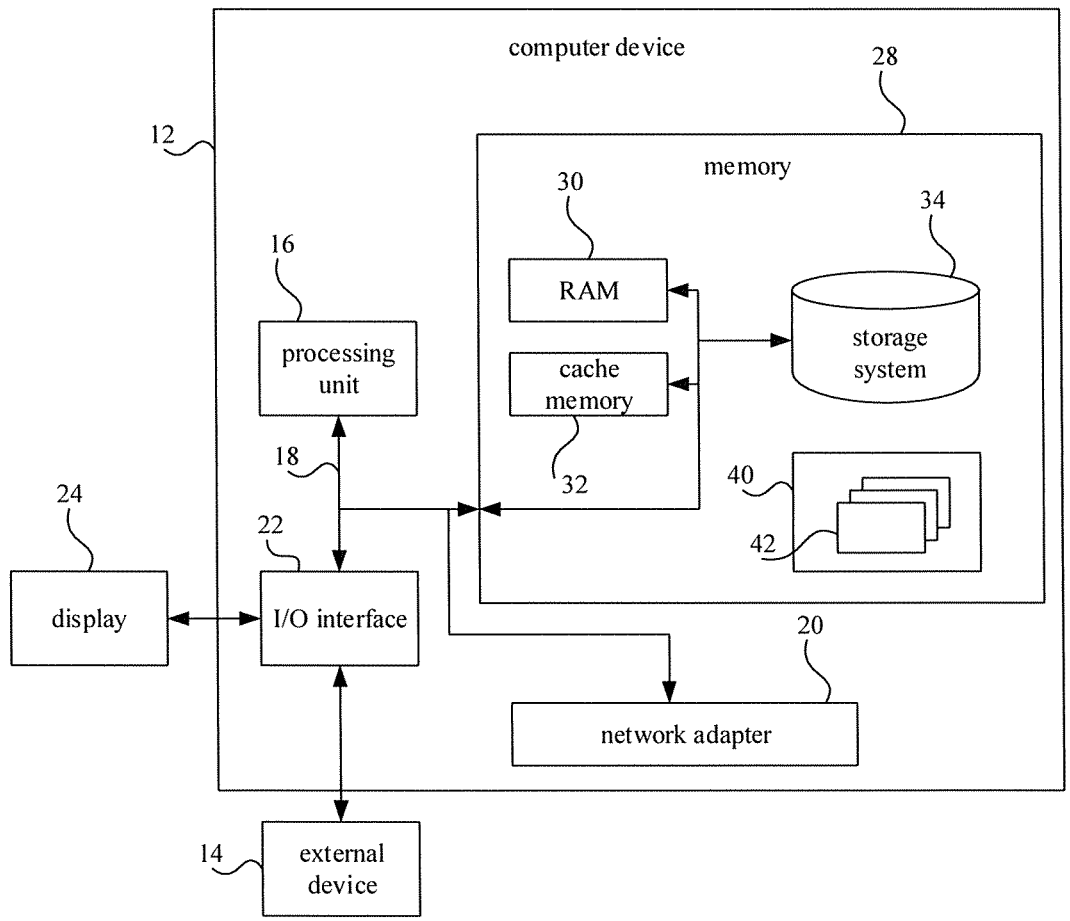
FIG. 8 is a block diagram illustrating an illustrative computer device configured to implement embodiments of the present disclosure.

FIG. 8 is a block diagram illustrating an exemplary computer device configured to implement an embodiment of the present disclosure. A computer device 12 illustrated in FIG. 8 is only an example and should not bring any limitation on the function or application range of the embodiment.

As illustrated in FIG. 8, the computer device 12 is represented in the form of a general-purpose computing device. Components of the computer device 12 may include but not limited to one or more processors or processing units 16, a memory 28, a bus 18 connected to different system components (including the memory 28 and the processing unit 16).

The bus 18 represents one or more of several types of bus structures, including a memory bus or a memory controller, a peripheral bus, a graphics acceleration port, a processor, or a local bus with any of a plurality of bus structures. For example, the architectures include, but are not limited to, an industry standard architecture (ISA) bus, a micro channel architecture (MAC) bus, an enhanced ISA bus, a video electronics standards association (hereinafter referred to as VESA) local bus and a peripheral component interconnection (PCI) bus.

The computer device 12 includes a variety of computer system readable media. The media may be any available media that may be accessed by the computer device 12, including volatile and non-volatile media, and removable and non-removable media.

The memory 28 may include a computer system readable medium in the form of a volatile memory, for example, a random access memory (RAM) 30 and/or a cache memory 32. The computer device 12 may further include other volatile and non-volatile media, and removable and non-removable media. As an example only, a storage system 34 may be configured to read and write a non-removable and non-volatile magnetic medium (not shown in FIG. 8, commonly referred to as a "hard disk drive"). Although not shown in FIG. 8, a disk drive for reading and writing a removable non-volatile magnetic disk (for example, a "floppy disk"), and an optical disk drive for reading and writing a removable non-volatile optical disk (such as a compact disc read only memory (CD-ROM)) and a digital video disc read only memory (DVD-ROM)) or other optical media) may be provided. In these cases, each driver may be connected to the bus 18 through one or more data media interfaces. The memory 28 may include at least one program product having a set of (for example, at least one) program modules configured to perform functions of embodiments of the present disclosure.

A program/utility 40 having a set of (at least one) program modules 42 may be stored, and for example, may be stored in the memory 28. The program modules 42 include but not limited to, an operating system, one or more applications, other program modules and program data, and each or 1o a certain of combination of these examples may include implementations of a network environment. The program modules 42 generally perform functions and/or methods in the embodiments described herein.

The computer device 12 may also communicate with one or more external devices 14 (for example, a keyboard, a pointing device, a display 24), and may communicate with one or more devices that enable a user to interact with the computer device 12, and/or any device (for example, a network card, a modem, etc.) that enables the computer device 12 to communicate with one or more other computing devices. The communication may be performed by an input/output (I/O) interface 22. And the computer device 12 may further communicate with one or more networks (such as a local area network (LAN), a wide area network (WAN), and/or a public network, such as Internet) through a network adapter 20. As shown, the network adapter 20 communicates with other modules of the computer device 12 via the bus 18. It should be understood that although not shown in the figures, other hardware and/or software modules may be used in combination with the computer device 12, including but not limited to: a microcode, a device driver, a redundant processing unit, an external disk drive array, a RAID system, a tape drive and a data backup storage system.

The processing unit 16 executes various function applications and data processings by running a program stored in the memory 28, and for example, implements the method mentioned in the foregoing embodiments.

In descriptions of the specification, descriptions with reference to terms "one embodiment", "some embodiments", "examples", "specific examples" or "some examples" etc. mean specific features, structures, materials or characteristics described in conjunction with the embodiment or example are included in at least one embodiment or example of the present disclosure. In this specification, the schematic representations of the above terms do not have to be the same embodiment or example. Moreover, specific features, structures, materials or characteristics described may be combined in any one or more embodiments or examples in a suitable manner. In addition, those skilled in the art may combine different embodiments or examples and characteristics of different embodiments or examples described in this specification without contradicting each other.

In addition, terms "first" and "second" used in the present disclosure are only for description purpose, and may not be understood as indicating or implying a relative importance or implying a number of technical features indicated by implication. Therefore, features limiting "first" and "second" may explicitly or implicitly include at least one of the features. In the description of the present disclosure, "a plurality of" means at least two, for example two, three, etc., unless otherwise specified.

Any process or method descriptions described in the flowchart or in other ways herein may be understood as a module, a segment or a part of a code including one or more executable instructions configured to implement steps of customized logical functions or processes, and scopes of embodiments of the present disclosure include additional implementations, which may include implement functions not be in the order shown or discussed including the substantially simultaneous manner according to functions involved or in reverse order, which should be understood by those skilled in the art of embodiments of the present disclosure.

The logic and/or steps represented in the flowchart or described in other ways herein, for example, may be considered as an ordered list of an executable instruction configured to implement logic functions, which may be specifically implemented in any computer readable medium, for use by an instruction execution system, an apparatus or a device (such as a computer-based system, a system including a processor, or other systems that may obtain and execute instructions from an instruction execution system, an apparatus or a device) or in combination with the instruction execution systems, apparatuses or devices. A "computer readable medium" in this specification may be an apparatus that may contain, store, communicate, propagate or transmit a program for use by an instruction execution system, an apparatus or a device or in combination with the instruction execution systems, apparatuses or devices. A more specific example of a computer readable medium (a non-exhaustive list) includes the followings: an electronic connector (an electronic apparatus) with one or more cables, a portable computer disk box (a magnetic device), a random access memory (RAM), a read-only memory (ROM), an erasable programmable read-only memory (an EPROM or a flash memory), an optical fiber device, and a portable optical disk read-only memory (CDROM). In addition, a computer readable medium may be even paper or other suitable medium on which a program may be printed, since paper or other medium may be optically scanned, and then edited, interpreted or processed in other suitable ways if necessary to obtain a program electronically and store it in a computer memory.

It should be understood that all parts of the present disclosure may be implemented with a hardware, a software, a firmware and their combination. In the above implementation, multiple steps or methods may be stored in a memory and implemented by a software or a firmware executed by a suitable instruction execution system. For example, if implemented with a hardware, they may be implemented by any of the following techniques or their combination known in the art as in another implementation: a discrete logic circuit with logic gate circuits configured to achieve logic functions on data signals, a special integrated circuit with appropriate combined logic gate circuits, a programmable gate array (PGA), a field programmable gate array (FPGA), etc.

Those skilled in the art may understand that all or part of steps in the above embodiments may be implemented by a program to instruct relevant hardware, in which the program may be stored in a computer readable storage medium including one or combination of steps in embodiments of the method when executing.

In addition, functional units in embodiments of the present disclosure may be integrated in a processing module, or may be physically existed separately, or two or more units may be integrated in a module. The above integrated module may be implemented in the form of a hardware or in the form of a software functional module. The integrated module may be stored in a computer readable storage medium if it is implemented in the form of a software functional module and sold and used as an independent product.

The foregoing storage medium may be a read-only memory, a magnetic disk or a compact disc, etc. It should be understood that, notwithstanding the embodiments of the present disclosure are shown and described above, the above embodiments are exemplary in nature and shall not be construed as a limitation of the present disclosure. Those skilled in the art may change, modify, substitute and vary the above embodiments within the scope of the present disclosure.

All embodiments of the disclosure may be executed separately or in combination with other embodiments, and are deemed within a protection scope of the disclosure.

What is claimed is:

1. A method for controlling a robotic arm, comprising:
   acquiring a first depth image and a first color image of a target object;
   predicting first predicted values and second predicted values of respective candidate actions of the robotic arm based on the first depth image and the first color image, wherein the first predicted value represents a probability of the robotic arm separating the target object from an adjacent object by executing the corresponding candidate action; and the second predicted value represents a probability of the robotic arm successfully grabbing the target object by executing the corresponding candidate action;
   determining a target action based on the first predicted values and the second predicted values of the candidate actions; and
   controlling the robotic arm to execute the target action;
   wherein determining the target action based on the first predicted values and the second predicted values of the candidate actions comprises:
   correcting the first predicted values of the candidate actions based on a contour of the target object indicated by the first depth image;
   correcting the second predicted values of the candidate actions based on a central position of the target object indicated by the first depth image; and
   selecting the target action from the candidate actions based on the corrected first predicted values and the corrected second predicted values.

2. The method according to claim 1, wherein predicting the first predicted values and the second predicted values of the candidate actions of the robotic arm based on the first depth image and the first color image comprises:
   obtaining a plurality of input depth images by rotating the first depth image by a plurality of preset angles respectively along a preset rotation direction;
   obtaining a plurality of input color images by rotating the first color image by the plurality of preset angles respectively along the preset rotation direction;
   predicting the first predicted values of the candidate actions by inputting the plurality of input depth images and the plurality of input color images into a first prediction network; and
   predicting the second predicted values of the candidate actions by inputting the plurality of input depth images and the plurality of input color images into a second prediction network.

3. The method according to claim 1, further comprising:
   acquiring a second depth image of the target object after executing the target action;
   determining a first reward value of the target action by using a classification network based on the second depth image and the first depth image, wherein the first reward value is configured to indicate an effective degree of the robotic arm separating the target object from the adjacent object by executing the target action;
   determining a second reward value of the target action based on whether the robotic arm successfully grabs the target object; and
   training the first prediction network based on the first reward value, and training the second prediction network based on the second reward value.

4. The method according to claim 3, wherein determining the first reward value of the target action by using the classification network based on the second depth image and the first depth image comprises:
   extracting features of the first depth image and the second depth image respectively by using a feature extraction layer of the classification network;
   obtaining a first fusion feature by fusing the feature of the first depth image with the feature of the second depth image; and
   obtaining the first reward value of the target action by performing a classification prediction on the first fusion feature by using a classification layer of the classification network.

5. The method according to claim 2, wherein predicting the first predicted values of the candidate actions by inputting the plurality of input depth images and the plurality of input color images into the first prediction network comprises:
   extracting features of the plurality of input depth images and the plurality of input color images by using a feature extraction layer of the first prediction network, and obtaining a plurality of first fusion feature images by fusing the features of the plurality of input depth images with the features of the plurality of input color images respectively;

reversely rotating each of the first fusion feature images along the preset rotation direction; and obtaining the first predicted values of the candidate actions by performing an action prediction on the first fusion feature images reversely rotated by using a prediction layer of the first prediction network.

6. The method according to claim 2, wherein predicting the second predicted values of the candidate actions by inputting the plurality of input depth images and the plurality of input color images into the second prediction network comprises:

extracting features of the plurality of input depth images and the plurality of input color images by using a feature extraction layer of the second prediction network, and obtaining a plurality of second fusion feature images by fusing features of the plurality of input depth images with features of the plurality of input color images respectively;

reversely rotating each of the second fusion feature images along the preset rotation direction; and obtaining the second reward values of the candidate actions by performing an action prediction on the second fusion feature images reversely rotated by using a prediction layer of the second prediction network.

7. The method according to claim 1, wherein acquiring the first depth image and the first color image of the target object comprises:

acquiring a captured original depth image and a captured original color image captured;

obtaining three-dimensional coordinate positions corresponding to pixel points in the original depth image and the original color image under a coordinate system of the robotic arm by converting the original depth image and the original color image to the coordinate system of the robotic arm;

obtaining two-dimensional coordinate points corresponding to the three-dimensional coordinate positions respectively by projecting the three-dimensional coordinate positions to a preset two-dimensional plane;

generating the first depth image based on depths of the pixel points corresponding to the two-dimensional coordinate points in the original depth image; and generating the first color image based on colors of the pixel points corresponding to the two-dimensional coordinate points in the original color image.

8. The method according to claim 7, wherein the preset two-dimensional plane is determined based on a minimum working distance along a preset direction under the coordinate system of the robotic arm.

9. A computer device, comprising a memory, a processor and a computer program stored on the memory and executable by the processor, when executing the computer program, the processor is configured to:

acquire a first depth image and a first color image of a target object;

predict first predicted values and second predicted values of respective candidate actions of the robotic arm based on the first depth image and the first color image, wherein the first predicted value represents a probability of the robotic arm separating the target object from an adjacent object by executing the corresponding candidate action; and the second predicted value represents a probability of the robotic arm successfully grabbing the target object by executing the corresponding candidate action;

determine a target action based on the first predicted values and the second predicted values of the candidate actions; and control the robotic arm to execute the target action;

wherein the processor is configured to:

correct the first predicted values of the candidate actions based on a contour of the target object indicated by the first depth image;

correct the second predicted values of the candidate actions based on a central position of the target object indicated by the first depth image; and select the target action from the candidate actions based on the corrected first predicted values and the corrected second predicted values.

10. A non-transitory computer-readable storage medium with a computer program stored thereon, wherein, when executed by a processor, the computer program is caused to implement;

acquiring a first depth image and a first color image of a target object;

predicting first predicted values and second predicted values of respective candidate actions of the robotic arm based on the first depth image and the first color image, wherein the first predicted value represents a probability of the robotic arm separating the target object from an adjacent object by executing the corresponding candidate action; and the second predicted value represents a probability of the robotic arm successfully grabbing the target object by executing the corresponding candidate action;

determining a target action based on the first predicted values and the second predicted values of the candidate actions; and controlling the robotic arm to execute the target action;

wherein determining the target action based on the first predicted values and the second predicted values of the candidate actions comprises:

correcting the first predicted values of the candidate actions based on a contour of the target object indicated by the first depth image;

correcting the second predicted values of the candidate actions based on a central position of the target object indicated by the first depth image; and selecting the target action from the candidate actions based on the corrected first predicted values and the corrected second predicted values.

11. The computer device according to claim 9, wherein the processor is configured to:

obtain a plurality of input depth images by rotating the first depth image by a plurality of preset angles respectively along a preset rotation direction;

obtain a plurality of input color images by rotating the first color image by the plurality of preset angles respectively along the preset rotation direction;

predict the first predicted values of the candidate actions by inputting the plurality of input depth images and the plurality of input color images into a first prediction network; and predict the second predicted values of the candidate actions by inputting the plurality of input depth images and the plurality of input color images into a second prediction network.

12. The computer device according to claim 9, wherein the processor is configured to:

acquire a second depth image of the target object after executing the target action;

determine a first reward value of the target action by using a classification network based on the second depth image and the first depth image, wherein the first reward value is configured to indicate an effective degree of the robotic arm separating the target object from the adjacent object by executing the target action;

determine a second reward value of the target action based on whether the robotic arm successfully grabs the target object; and train the first prediction network based on the first reward value, and train the second prediction network based on the second reward value.

13. The computer device according to claim 12, wherein the processor is configured to:

extract features of the first depth image and the second depth image respectively by using a feature extraction layer of the classification network;

obtain a first fusion feature by fusing the feature of the first depth image with the feature of the second depth image; and obtain the first reward value of the target action by performing a classification prediction on the first fusion feature by using a classification layer of the classification network.

14. The computer device according to claim 11, wherein the processor is configured to:

extract features of the plurality of input depth images and the plurality of input color images by using a feature extraction layer of the first prediction network, and obtain a plurality of first fusion feature images by fusing the features of the plurality of input depth images with the features of the plurality of input color images respectively;

reversely rotate each of the first fusion feature images along the preset rotation direction; and obtain the first predicted values of the candidate actions by performing an action prediction on the first fusion feature images reversely rotated by using a prediction layer of the first prediction network.

15. The computer device according to claim 11, wherein the processor is configured to:

extract features of the plurality of input depth images and the plurality of input color images by using a feature extraction layer of the second prediction network, and obtain a plurality of second fusion feature images by fusing features of the plurality of input depth images with features of the plurality of input color images respectively;

reversely rotate each of the second fusion feature images along the preset rotation direction; and obtain the second reward values of the candidate actions by performing an action prediction on the second fusion feature images reversely rotated by using a prediction layer of the second prediction network.

16. The computer device according to claim 9, wherein the processor is configured to:

acquire a captured original depth image and a captured original color image captured;

obtain three-dimensional coordinate positions corresponding to pixel points in the original depth image and the original color image under a coordinate system of the robotic arm by converting the original depth image and the original color image to the coordinate system of the robotic arm;

obtain two-dimensional coordinate points corresponding to the three-dimensional coordinate positions respectively by projecting the three-dimensional coordinate positions to a preset two-dimensional plane;

generate the first depth image based on depths of the pixel points corresponding to the two-dimensional coordinate points in the original depth image; and generate the first color image based on colors of the pixel points corresponding to the two-dimensional coordinate points in the original color image.

17. The computer device according to claim 16, wherein the preset two-dimensional plane is determined based on a minimum working distance along a preset direction under the coordinate system of the robotic arm.

* * * * *